United States Patent [19]
Finley

[11] Patent Number: 5,972,421
[45] Date of Patent: *Oct. 26, 1999

[54] METHOD FOR PRODUCING PELLETIZED PAVEMENT MARKING MIXTURES

[75] Inventor: Walter Brian Finley, Dunwoody, Ga.

[73] Assignee: Stimsonite Corporation, Niles, Ill.

[*] Notice: This patent is subject to a terminal disclaimer.

[21] Appl. No.: 09/190,749

[22] Filed: Nov. 12, 1998

Related U.S. Application Data

[63] Continuation of application No. 08/631,475, Apr. 12, 1996.

[51] Int. Cl.$^6$ ............................... B05C 1/16; F21V 7/22; C08L 67/06; C08K 3/26
[52] U.S. Cl. ........................ 427/137; 523/172; 523/514; 523/515; 523/527; 524/413; 524/425; 524/499
[58] Field of Search ..................... 523/172, 514, 523/515, 516, 527; 524/413, 425, 474, 494, 497; 427/137

[56] References Cited

U.S. PATENT DOCUMENTS

| | | | |
|---|---|---|---|
| Re. 28,531 | 8/1975 | de Vries .................................. | 523/172 |
| 2,268,537 | 5/1941 | Shuger .................................... | 427/137 |
| 2,330,843 | 5/1943 | Rodli et al. ............................. | 428/149 |
| 2,879,171 | 3/1959 | Kullenberg ............................. | 523/172 |
| 3,297,617 | 1/1967 | Regenstein, Jr. et al. .............. | 523/172 |
| 3,664,242 | 5/1972 | Harrington et al. .................... | 427/137 |
| 3,849,351 | 11/1974 | Jorgensen ............................... | 523/173 |
| 3,935,158 | 1/1976 | Watanabe ................................ | 523/173 |
| 4,230,615 | 10/1980 | Crocker et al. ......................... | 523/303 |
| 4,297,450 | 10/1981 | Sato et al. ............................... | 523/172 |
| 4,689,373 | 8/1987 | Auerbach et al. ...................... | 525/398 |
| 4,856,931 | 8/1989 | Bollag .................................... | 427/137 |
| 4,918,130 | 4/1990 | Kano et al. ............................. | 524/499 |
| 4,937,127 | 6/1990 | Haenggi et al. ........................ | 428/149 |
| 4,983,458 | 1/1991 | Dejaiffe ................................... | 523/172 |
| 5,039,557 | 8/1991 | White ...................................... | 427/137 |
| 5,053,253 | 10/1991 | Haenggi et al. ........................ | 427/137 |
| 5,124,178 | 6/1992 | Haenggi et al. ........................ | 427/137 |
| 5,128,203 | 7/1992 | LaRoche ................................. | 428/325 |
| 5,258,434 | 11/1993 | Hanabusa ............................... | 524/310 |
| 5,373,027 | 12/1994 | Hanley et al. .......................... | 521/140 |

FOREIGN PATENT DOCUMENTS

| | | | |
|---|---|---|---|
| 0023058 | 8/1975 | Japan ..................................... | 523/172 |
| 0212473 | 9/1987 | Japan ..................................... | 523/172 |

*Primary Examiner*—Peter A. Szekely
*Attorney, Agent, or Firm*—Jones, Day, Reavis & Pogue

[57] ABSTRACT

A method for producing a pelletized pavement marking mixture includes selecting an appropriate thermoplastic binder that is a solid at ambient temperatures and heating the appropriate thermoplastic binder in a reaction vessel to a temperature sufficient to form a liquid thermoplastic binder; forming a heated pavement marking mixture by adding a plasticizer and a filler to the liquid thermoplastic binder in the reaction vessel; forming a substantially homogeneous pavement marking mixture by blending the heated pavement marking mixture for period sufficient to substantially evenly distribute the plasticizer and the filler within the liquid thermoplastic resin while maintaining the heated pavement mixture at an elevated temperature; extruding the substantially homogeneous pavement marking mixture from the reaction vessel to form an extruded substantially homogeneous pavement marking mixture; and pelletizing the extruded substantially homogeneous pavement marking mixture. A pavement marking mixture consists of a substantially homogeneous mixture of pellets. Each of the pellets in the pavement marking mixture consists of a substantially homogeneous blend of a thermoplastic binder, a plasticizer, and a filler. The method for making a pelletized pavement marking mixture can be extended by adding a pigment and retroreflective particles to the heated pavement marking mixture.

15 Claims, No Drawings

METHOD FOR PRODUCING PELLETIZED PAVEMENT MARKING MIXTURES

This is a continuation of U.S. Ser. No. 08/631,475 filed on Apr. 12, 1996.

FIELD OF THE INVENTION

This invention relates generally to a method for producing pavement marking mixtures, and more particularly to a method for producing pavement marking mixtures that incorporate retroreflective particles.

BACKGROUND OF THE INVENTION

Pavement markings are used extensively to visually delineate portions of a road surface, for example, the edges or center of the road surface. In some applications, the pavement marking is simply a colored mixture. For example, Regenstein et al., U.S. Pat. No. 3,297,617 disclose a coating slurry that can contain various pigments which can be used to mark a road surface. Frequently, retroreflective particles, such as glass beads, are added to pavement markings to improve the visibility of the pavement marking in adverse situations, such as at night. Bollag, U.S. Pat. No. 4,856,931 discloses a pavement marking that is produced by painting a line on the pavement and thereafter scattering glass beads over the painted line while the paint is still tacky. Shuger, U.S. Pat. No. 2,268,537, de Vries, U.S. Pat. No. RE 28,531, La Roche, U.S. Pat. No. 5,128,203, and Rodli et al., U.S. Pat. No. 2,330,843 similarly disclose solvent-based pavement marking mixtures that are applied to the pavement, for example, by spraying. Glass beads are then applied to the mixtures while the mixtures are still semi-wet or tacky. Kullenberg, U.S. Pat. No. 2,879,171 discloses a solvent-based pavement marking mixture that includes glass beads in a stabilized aqueous dispersion.

Pavement marking mixtures using non-solvent based materials have been proposed. La Roche, U.S. Pat. No. 5,128,203 discloses a two component acrylic matrix-forming material that is applied to the pavement. Glass beads are then sprinkled over the applied matrix-forming material within one minute of mixing the acrylic matrix-forming material. La Roche also discloses a pavement marking kit based on a thermoplastic matrix-forming material. The thermoplastic matrix-forming material is heated and applied to the pavement. Glass beads are then sprinkled over the thermoplastic material while it is still liquid. Haenggi et al., U.S. Pat. Nos. 4,937,127, 5,053,253, and 5,124,178 disclose a pavement marking tape that includes a base sheet which has an upper polymer matrix surface. Glass beads are embedded in the matrix surface before it is cured. The final tape product, which includes glass beads, is then affixed to a road surface with an adhesive. Jorgensen et al., U.S. Pat. No. 3,849,351 disclose a particulate pavement marking mixture that includes a thermoplastic phase which consists principally of polyamide condensation products of polycarboxylic acid and polyamine, and glass beads. The pavement marking mixture is applied to a road surface using a flame-applicator.

Conventional pavement marking mixtures suffer from disadvantages. As noted earlier retroreflective particles, such as glass beads, are frequently added to the surface of pavement markings before the pavement marking mixtures have set-up on the road surface. Initially, the surface-added retroreflective particles improve the visibility of the pavement markings. However, the retroreflective particles tend to wear away under traffic and the like. Thus pavement marking mixtures that depend on surface-added retroreflective particles to enhance their visibility lose their retroreflective characteristics over time, also relatively long application times are required for solvent-based pavement marking mixtures. Solvent-based pavement marking mixtures generally become set when the solvent evaporates. The amount of time required for the solvent to evaporate varies with the type of solvent used and the solvent-percentage composition. However, drying times on the order of 15 to 60 minutes are not unusual. Consequently, pavement markings formed from solvent-based pavement marking mixtures frequently must be protected from traffic for relatively long periods. The setting time for solvent-based mixtures thus restricts traffic flow and increases the cost of using such mixtures.

Conventional thermoplastic-based pavement marking mixtures suffer from additional disadvantages. Conventional thermoplastic-based pavement marking mixtures generally are marketed as heterogeneous mixtures of individual, raw components. Consequently, the end-user must mix together the raw components at elevated temperatures for significant time periods before the pavement marking mixture is ready to be applied to a road surface. In addition, the raw components generally have varying melting temperatures and so are not readily liquified. Extended mixing times and variable temperature requirements increase the cost of applying the mixture to a road surface and thus increase the cost of using such mixtures.

SUMMARY OF THE INVENTION

It is therefore an object of this invention to provide a method for producing a pavement marking mixture that does not require extensive mixing by the end-user.

Another object of this invention is to provide a method for producing a pavement marking mixture that is pre-mixed and easy to store and which is readily liquified by the end-user in preparation for applying the mixture to a road surface.

Another object of this invention is to provide a method for producing a pavement marking mixture that sets within a few minutes of application to a road surface.

Another object of this invention is to provide a method for producing a pavement marking mixture that retains its retroreflective characteristics even after wear from, for example, traffic and the like.

A further object of this invention is to provide a method for producing a pavement marking mixture that is retroreflective and resistant to weathering.

A further object of this invention is to provide a pavement marking mixture that does not require extensive mixing by the end-user, melts readily, resists weathering, and, when applied to a road surface, sets up within a few minutes of application.

These and other objectives and advantages are provided by the present invention which is a method for producing a pelletized pavement marking mixture. One first selects an appropriate thermoplastic binder that is a solid at ambient temperatures. The selected thermoplastic binder is then heated in a reaction vessel to a temperature that is sufficient to liquify the thermoplastic resin. A heated pavement marking mixture is then formed by adding a plasticizer and a filler to the liquid thermoplastic resin. Thereafter a substantially homogeneous pavement marking mixture is formed by lending the heated pavement marking mixture for a period that is sufficient to substantially evenly distribute the plasticizer and filler within the liquid thermoplastic binder, while continuously maintaining the heated pavement marking mixture at an elevated temperature. The substantially homogeneous pavement marking mixture is then extruded from the reaction vessel and is pelletized.

The present inventive method provides a substantially homogeneous pelletized pavement marking mixture that consists of pellets, each of which is formed from a substantially homogeneous blend of thermoplastic binder, plasticizer, and filler. The individual pellets formed from the present inventive method each consist of a substantially homogeneous extruded blend of thermoplastic binder, plasticizer, and filler. The present inventive method thus provides a pelletized pavement marking mixture that does not require extensive mixing by the end-user because the components of the pellets have been pre-blended, heated, and extruded to form a substantially homogeneous mixture. In addition, the pellets produced by the present inventive method are readily melted because of their relatively high surface area.

The method can be further refined by adding a pigment, or retroreflective particles, or both to the heated pavement marking mixture thereby providing a pelletized pavement marking mixture that is retroreflective when applied to a road surface.

DETAILED DESCRIPTION

In the preferred practice of this invention, one first selects an appropriate thermoplastic binder that is a solid at ambient temperatures. Appropriate thermoplastic binders for the present invention liquify within a temperature range of from about 210° F. to about 290° F., are free-flowing at elevated temperatures, adhere well to the desired road surface, adhere well to the retroreflective particles, and resist weathering. Alkyd resins and hydrocarbon resins having the foregoing characteristics are preferred in the practice of the present invention. The selected appropriate thermoplastic binder is then heated in a reaction vessel to a temperature sufficient to form a liquid thermoplastic binder. A heated pavement marking mixture is then formed by adding a plasticizer, a pigment, a filler, and retroreflective particles to the liquid thermoplastic binder in the reaction vessel. Suitable plasticizers in accordance with the present invention are liquids at ambient temperatures and have flash points above about 450° F. Alkyd oils and hydrocarbon oils having the foregoing characteristics are preferred in the practice of the present invention. Suitable pigments in accordance with the invention are properly and substantially uniformly sized to provide a smooth and consistent product when mixed with a suitable thermoplastic binder and a suitable plasticizer. The color and amount of pigment used can be varied according to local regulations. For example, if a yellow pavement marking is desired, any pigment having the foregoing properties that will also impart a yellow coloring to the pavement marking is appropriate. Suitable fillers in accordance with the present invention are white, opaque, substantially free from foreign particles, and properly and substantially uniformly sized to provide a smooth and consistent product when mixed with a suitable thermoplastic binder and a suitable plasticizer. Calcium carbonate having the foregoing characteristics is preferred. Suitable retroreflective particles are properly and substantially uniformly sized to provide a smooth and consistent product when mixed with a suitable thermoplastic binder and a suitable plasticizer. Glass beads having the foregoing characteristics are preferred. Especially preferred are glass beads that have a refractive index within a range of from about 1.50 to about 1.90, are sized within a range of 20 to 100 sieve size, and are 70% to 80% round.

A substantially homogeneous pavement marking mixture is then formed by blending the heated pavement marking mixer for a period that is sufficient to substantially evenly distribute the plasticizer, pigment, filler, and retroreflective particles within the liquid thermoplastic resin while maintaining the heated pavement marking mixture at an elevated temperature. The substantially homogeneous pavement marking mixture is then extruded from the reaction vessel and thereafter is pelletized.

The foregoing method produces a substantially homogeneous pelletized pavement marking mixture that consists of pellets, each of which is formed from a substantially homogeneous blend of thermoplastic binder, plasticizer, filler, pigment, and retroreflective particles. The individual pellets formed from the present inventive method preferably each consist of at least one retroreflective particle that is at least partially enveloped within a substantially homogeneous extruded blend of thermoplastic binder, plasticizer, filler, and pigment.

The pelletized pavement marking mixture formed from the present inventive method provides several advantages over conventional pavement marking mixtures. To begin with, the pelletized pavement marking mixture formed from the foregoing method minimizes the extended mixing times required by conventional thermoplastic-based pavement marking mixtures. Conventional thermoplastic-based pavement marking mixtures are generally marketed as heterogeneous mixtures of individual, raw components. Consequently, the end-user must mix together the raw components at elevated temperatures for significant time periods before the pavement marking mixture is ready to be applied to a road surface. In contrast, pelletized pavement marking mixtures in accordance with the present invention have been pre-blended, heated, and extruded to form a substantially homogeneous mixture. Extended mixing by the end-user is therefore minimized. Moreover, the relatively high surface area of the individual pellets helps to promote rapid heat transfer and melting, thereby minimizing the time required to liquify the pavement marking mixture prior to application.

Pelletized pavement marking mixtures in accordance with the present invention are also easier to store than are conventional thermoplastic-based pavement marking mixtures. Pelletized pavement marking mixtures in accordance with the present invention resist weathering during storage because the filler has been pre-blended and extruded with the thermoplastic components. In contrast, raw fillers which form a portion of conventional heterogeneous thermoplastic-based pavement marking mixtures can deteriorate during storage because of adverse weather conditions, such as rain or excessive humidity.

In addition, quality assurance is enhanced by pelletized pavement marking mixtures in accordance with the present invention. Pelletized pavement marking mixtures in accordance with the invention are easily sampled for quality assurance because such mixtures are substantially homogeneous. In contrast, proper sampling of conventional heterogenous pavement marking mixtures can require mixing if the individual components of the conventional heterogeneous pavement marking mixtures settle or segregate during shipping and handling. Pavement markings formed from pelletized pavement marking mixtures in accordance with the invention also retain their retroreflective characteristics for relatively long periods. When a pelletized pavement marking mixture in accordance with the present invention is applied to a road surface to form a pavement marking, at least a portion of the retroreflective particles in the substantially homogeneous pelletized mixture becomes embedded below the surface of the pavement marking and thus is more resistant to wear.

The invention is further illustrated by the following examples.

EXAMPLE 1.

660 pounds of solid alkyd resin is liquified in an oil jacketed heating vessel to a temperature of about 300° F. Thereafter, 90 pounds of alkyd oil, 400 pounds of rutile titanium dioxide, 1,700 pounds of calcium carbonate, and 1,200 pounds of glass beads are added to the liquified alkyd resin. The so-formed mixture is blended together for a period of 45 minutes at a sustained temperature of about 310° F. to form a substantially homogeneous pavement marking mixture. The so-formed substantially homogeneous pavement marking mixture is then extruded from the heating vessel and is subsequently pelletized.

EXAMPLE 2.

660 pounds of solid hydrocarbon resin is liquified in an oil jacketed heating vessel to a temperature of about 300° F. Thereafter, 90 pounds of hydrocarbon oil, 400 pounds of rutile titanium dioxide, 1,700 pounds of calcium carbonate, and 1,200 pounds of glass beads are added to the liquified hydrocarbon resin. The so-formed mixture is blended together for a period of 45 minutes at a sustained temperature of about 310° F. to form a substantially homogeneous pavement marking mixture. The so-formed substantially homogeneous pavement marking mixture is then extruded from the heating vessel and is subsequently pelletized.

The pelletized pavement marking mixtures produced by the foregoing examples in accordance with the invention minimize the amount of mixing time required by the end-user because the components have been pre-blended, heated, and extruded to form substantially homogeneous pellets. The pelletized mixtures also resist weathering during storage because the fillers have been incorporated into the substantially homogeneous pellets. The pelletized mixtures are later readily melted in preparation for application and when applied to a road surface, set up within a few minutes of application to a road surface and resist weathering.

The present invention also provides a generic pelletized pavement marking mixture that can be further processed by the end-user to satisfy local regulations. The types and colors of pigments used in pavement markings vary as a function of local regulations, as do the types and characteristics of retroreflective particles. The present invention provides a method for forming a pelletized pavement marking mixture that can be readily adapted to local regulations while also minimizing mixing times and heating times, and facilitating storage and quality assurance. One first selects an appropriate thermoplastic binder that is a solid at ambient temperatures. The selected thermoplastic binder is then heated in a reaction vessel to a temperature that is sufficient to liquify the thermoplastic binder. A heated thermoplastic pavement marking mixture is then formed by adding a plasticizer and filler to the liquid thermoplastic binder. The heated thermoplastic mixture is then blended at an elevated temperature for a period that is sufficient to substantially evenly distribute the plasticizer and filler within the liquid thermoplastic binder, thereby forming a substantially homogeneous pavement marking mixture. The substantially homogeneous pavement marking mixture is then extruded from the reaction vessel and thereafter is pelletized.

Pelletized pavement marking mixtures formed by the foregoing method consist of individual pellets that include thermoplastic binder, plasticizer, and filler. The pelletized mixture can then be customized by the end-user by adding the types and amounts of pigment and retroreflective particles that are specifically required by local regulations. Pelletized pavement marking mixtures formed by the foregoing method are more readily mixed by the end-user than are conventional mixtures because three of the components, the binder, the plasticizer, and the filler, have been previously measured, blended and extruded to form substantially homogeneous pellets. The pellets are readily melted in preparation for customization by the end-user because the relatively high surface area of the substantially homogeneous pellets facilitates heat transfer and melting. The pellets are readily sampled and handled because each pellet contains the necessary proportions of binder, plasticizer, and filler, thus making individual sampling and weighing of these components unnecessary. Storage problems are also minimized because the filler has been incorporated into substantially homogeneous, extruded pellets that resist weathering.

Extruded, substantially homogeneous pavement marking mixtures according to the present invention can be pelletized by a variety of methods. The exact method used to pelletize the extruded, substantially homogeneous pavement marking mixture depends on the types and characteristics of the components used in forming the pellets. For example, pelletization methods commonly known as granulation or briquetting, mixing agglomeration, and extrusion agglomeration can be used to pelletize the substantially homogeneous pavement marking mixture. In some circumstances, for example, when extrusion agglomeration is used, the substantially homogeneous pavement marking mixture can be pelletized directly from the reaction vessel.

In use, pavement marking mixtures according to the present invention are first melted to form a homogenous mass and a measured amount of the homogenous mass is then applied to the road surface. If generic pavement marking pellets are used, before the homogenous mass is applied to the road surface a pigment, as well as retroreflective particles, can be added in amounts that are specifically required by local regulations. The homogenous mass formed from pavement marking mixtures according to the invention can be applied to a road surface as a hot spray. The homogeneous mass formed from pavement marking mixtures in accordance with the present invention can also be applied to a road surface by screed extrusion and ribbon extrusion methods. Immediately after application, retroreflective particles are scattered over the surface of the pavement markings to enhance the initial retroreflectance of the pavement markings. After being applied to the road surface, pavement marking mixtures in accordance with the invention set up within a few minutes to form finished pavement markings that are retroreflective and resistant to weathering. Pavement markings formed from pavement marking mixtures in accordance with the invention also retain their retroreflective characteristics for relatively long periods because at least a portion of the retroreflective particles that form a part of the substantially homogeneous pelletized mixture is embedded below the surface of the pavement marking and thus is more resistant to wear, the particles becoming exposed and functional as the marker wears away.

Although the present invention has been described with reference to preferred embodiments, it will be understood that various changes and modifications will be suggested to one skilled in the art and it is intended that the invention encompass such changes and modifications as fall within the scope of the appended claims.

What is claimed is:

1. A method of marking a roadway surface, said method comprising providing a substantially evenly blended pelletized pavement marking mixture, said pelletized mixture comprising a substantially even blend of a thermoplastic resin that is solid at ambient temperature, a plasticizer, and a filler, melting a desired portion of said substantially evenly blended pelletized pavement marking mixture to form a homogenous mass, and applying an amount of said molten homogenous mass to the roadway surface to form a pavement marking visible to drivers of vehicles on the roadway surface.

2. The method of claim 1 wherein said molten homogenous mass is applied to the roadway surface as a hot spray.

3. The method of claim 1 wherein said molten homogenous mass is applied to the roadway surface by extrusion.

4. The method of claim 1 comprising the further step, after said step of applying said amount of said molten homogenous mass to the roadway surface to form a pavement marking, of scattering retroreflective particles over the surface of said pavement marking.

5. The method of claim 1 wherein said thermoplastic resin is present in the amount of about 16% by weight of said pavement marking mixture.

6. The method of claim 1 wherein said plasticizer is present in the amount of about 2% by weight of said pavement marking mixture.

7. The method of claim 1 wherein said filler is present in the amount of about 42% by weight of said pavement marking mixture.

8. The method of claim 1 wherein said thermoplastic resin is selected from the group consisting of an alkyd resin and a hydrocarbon resin.

9. The method of claim 1 wherein said filler is calcium carbonate.

10. The method of claim 1 wherein said pavement marking mixture further comprises a pigment.

11. The method of claim 10 wherein said pigment is present in the amount of about 10% by weight of said pavement marking mixture.

12. The method of claim 10 wherein said pigment is rutile titanium dioxide pigment.

13. The method of claim 1 wherein said pavement marking mixture further comprises retroreflective particles.

14. The method of claim 13 wherein said retroreflective particles are present in the amount of about 30% by weight of said pavement marking mixture.

15. The method of claim 13 wherein said retroreflective particles are glass beads.

* * * * *